United States Patent Office 3,252,943
Patented May 24, 1966

3,252,943
PREPARATION OF POLYETHER-
POLYURETHANE PLASTICS
Gerhard Dankert, Cologne-Flittard, and Hans Holt-
schmidt, Cologne-Stammheim, Germany, assignors to
Farbenfabriken Bayer Aktiengesellschaft, Leverkusen,
Germany, a German corporation
No Drawing. Filed Jan. 24, 1962, Ser. No. 168,535
Claims priority, application Germany, Jan. 25, 1961,
F 33,053
5 Claims. (Cl. 260—77.5)

This invention relates to polyurethane plastics and to a process of preparing the same. More particularly, it relates to polyurethane plastics in the form of cellular materials, elastomeric materials, lacquers, foils, molding compositions, adhesives, textile coatings, and the like based on polyethers.

It has been heretofore known to prepare polyurethane plastics utilizing linear and branched polypropylene glycols as the compound containing active hydrogen atoms. This material has found wide-spread use throughout the urethane industry however, the property diagram and especially the tensile strength of elastic molded elements produced with this polyglycol is not entire satisfactory.

It is, therefore, an object of this invention to provide polyurethane plastics having an improved property diagram. It is another object of this invention to provide polyurethane plastics having improved tensile strength. It is still another object of this invention to provide an improved polyurethane plastic utilizing polyhydric polyalkylene ethers. It is a further object of this invention to provide an improved method of preparing polyurethane plastics.

The foregoing objects and others, which will become apparent from the following description, are accomplished in accordance with this invention, generally speaking, by providing polyurethane plastics by reacting an organic polyisocyanate with a mixture of a polyhydric polyalkylene ether having ethylene or 1,2-propylene units in the alkylene chain and a polyhydric polyalkylene ether having at least 6 carbon atoms in the alkylene chain. Attempts have been made previously to improve the properties of polyurethanes using a polyhydric polyalkylene ether having 2 or 3 carbon atoms in the alkylene chain by the addition of polyesters, polyacetals, polythioethers and the like to the polyalkylene ether. These attempts, however, did not prove fruitful for the reason that these components are not very compatible because of the low miscibility of one in the other. Further attempts have been made to use mixtures of hydroxyl poly(hexamethylene oxide) with, for instance, hydroxyl poly(trimethylene oxide) in the manufacture of isocyanate-based elastomers. The prior art, however, expressly states that mixtures with hydroxyl poly(ethylene oxide) and hydroxyl poly(1,2-propylene oxide) have been proven non-satisfactory.

In accordance with this invention, small additions of polyhydric polyalkylene ethers having at least six carbon atoms in the alkylene chain to a polyhydric polyalkylene ether having ethylene or 1,2-propylene units in the alkylene chain, such as a polypropylene glycol, produce mechanical properties in the completed article which are considerably superior to those prepared only from polypropylene glycols. For example, the tensile strength of a molded element obtained from a mixture of 80% of a polypropylene ether glycol and 20% of a polyhexylene ether glycol is increased to above 200%. Further, it is also of industrial importance that substantially harder and more elastic products can be produced from the mixtures employed than from pure polypropylene ether glycols.

The polyhydric polyalkylene ethers of both classes necessary for the practice of this invention, that is, those having ethylene or 1,2-propylene units in the alkylene chain and those having at least 6 carbon atoms in the alkylene chain, preferably having a molecular weight of at least about 600 and more preferably from about 600 to about 10,000. The polyhydric polyalkylene ether having at least 6 carbon atoms in the alkylene chain may be used in an amount of at least 10% by weight based on the weight of the mixture of polyhydric polyalkylene ethers and preferably in an amount of from 20% by weight to about 50% by weight, that is, the ratio of the polyalkylene ether having at least 6 carbon atoms in the alkylene chain to the polyalkylene ether having ethylene or propylene units in the alkylene chain will vary from about ¼ to about 1. Even larger quantities of the polyalkylene ether having at least 6 carbon atoms in the chain may be used, however, because of the economics, it is not feasible to use higher quantities of this material.

Any suitable polyhydric polyalkylene ether having at least 6 carbon atoms in the alkylene chain may be used in the process of this invention, such as, for example, those prepared by the process described in copending U.S. application Serial No. 134,595, now U.S. Patent 3,188,353. This application describes a process wherein glycols having at least 6 carbon atoms in the chain are added at a temperature of from about 125° C. to about 250° C. in the presence of a catalyst to prepare polyalkylene ether glycols. Suitable glycols having at least 6 carbon atoms in the chain include such as, for example, 1,6-hexane diol, 1,7-heptane diol, 1,8-octane diol, 1,9-nonane diol 1,10-decane diol 1,12-octadecane diol, hexahydroxylylene glycol and the like. Of course, higher functional compounds may be used in minor amounts in conjunction with the glycols to produce branched polyethers. Any suitable higher functional compounds may be used such as, for example, trimethylol propane, pentaerythritol, glycerine, mannitol and the like. These materials should be used in an amount less than 20% by weight and preferably in amount of from about 1 to about 10% by weight.

In the preparation of polyurethanes in accordance with this invention, the polyalkylene glycol ethers having ethylene or 1,2-propylene units in the alkylene chain may be used such as, for example, the polymers prepared from ethylene oxide, 1,2-propylene oxide, as well as their copolymers. Also the condensation products of one or both of the aforementioned alkylene oxides with suitable glycols such as, for example, ethylene glycol and propylene glycol may be used.

In the reaction with the mixture of polyalkylene ether glycols any suitable polyisocyanate may be used, such as, for example, 4,4'-diphenyl methane diisocyanate,
Diphenyl dimethyl methane 4,4'-diisocyanate,
2,4-tolylene diisocyanate,
2,6-tolylene diisocyanate,
p-Phenylene diisocyanate,
m-phenylene diisocyanate,
1,4-naphthylene diisocyanate,
1,5-naphthylene diisocyanate,
diphenyl-4,4'-diisocyanate,
azobenzene-4,4'-diisocyanate,
diphenyl sulfone-4,4'-diisocyanate,
dicyclohexane-4,4'-diisocyanate,
tetramethylene diisocyanate,
hexamethylene diisocyanate,
1-chloro-2,4-phenylene diisocyanate,
triphenyl methane-4,4',4''-triisocyanate,
2,4,6-tolylene triisocyanate, urea diisocyanates such as, the reaction product of 2 mols of tolylene diisocyanate with 1 mol of water, the trimerization and dimerization products of any of the aforementioned polyisocyanate, the reaction products of an excess of a polyisocyanate with dihydric and polyhydric alcohols such as, for example, the reaction product of 1 mol of trimethylol propane with 3 mols of tolylene diisocyanate, and substances known to split off polyisocyanate such as, for example, the reaction products of any of the aforementioned polyisocyanates with phenols, and the like.

As state previously, the process in accordance with this invention is suitable for the preparation of coatings, elastomers, cellular products and the like, depending upon the ultimate use to which the product is to be put. For example, in the preparation of a suitable coating or film, the aforedescribed mixture of polyalkylene ethers are reacted with an excess of an organic polyisocyanate and applied to a substrate in a suitable solvent solution therefor. The reaction may be conducted in the solvent or the reaction product can be dissolved in the solvent. After evaporation of the solvent, the film cures by contact with moisture in the air either in the cold or by heating.

In the preparation of a cellular product, the mixture of polyethers is reacted in the presence of accelerators, emulsifiers with the polyisocyanate and water or another blowing agent, thereby producing a cellular product. The polyisocyanate may be reacted with the mixture of ethers previously to prepare an —NCO terminated prepolymer and then with the blowing agent or the entire reaction can be conducted simultaneously. Any suitable blowing agent may be used in addition to or in place of water such as, for example, halogenated hydrocarbons such as, for example, dichlorodifluoromethane, trichlorofluoromethane and the like.

Elastomeric materials including castings, moldings, fibers, and the like may be prepared in accordance with this invention by several techniques. For example, a mix of the above-identified polyethers can be reacted with an organic diisocyanate in a quantity in excess of that necessary for the linear lengthening of the chain and then crosslinging the reaction product by the addition of any suitable cross-linking agent. The reaction mass can be shaped into its desired final form by casting immediately or the reaction may be interrupted to prepare a partially reacted solid commonly referred to as a green stock and then at a subsequent time shaping this solid into the desired final form by the application of heat or both heat and pressure The mixture of polyethers may also be reacted with an excess of diisocyanate to obtain an —NCO terminated product which is then reacted with a chain extender to produce an active hydrogen terminated storable intermediate. This stage can also be reached by reacting a deficiency of an isocyanate simultaneously with the mixture of polyethers in accordance with this invention and a chain extending agent. This product can then be reacted in a second stage with an additional quantity of a polyisocyanate or another cross-linking agent such as, formaldehyde, sulfur, organic peroxide and the like, generally on a mill usually found in the rubber industry, to form an elastomeric material.

Any suitable chain extending agent may be used, such as, for example, polyhydric alcohols including ethylene glycol, propylene glycol, 1,3-butylene glycol, 2,3-butylene glycol, 1,4-butylene glycol, p-phenylene-bis-$\beta$-hydroxy ethyl ether, trimethylol propane, glycerine, pentaerythritol, hexane triol, and the like; diamines such as, for example, hexamethylene diamine, 3,3'-dichloro benzidine, 2,5-dichloro-p-phenylene diamine, hydrazine, phenylene diamine, tolylene diamine, 4,4'-diaminodiphenyl methane and the like; amino alcohols such as, for example, aminoethyl alcohol, aminopropyl alcohol, aminobutyl alcohol and the like; aminocarboxylic acids such as, for example, $\beta$-aminopropionic acid, piperidic acid, glycine, m-amino-benzoic acid, aminosuccinic acid, and the like; hydroxy carboxylic acids such as, for example, $\beta$-hydroxy propionic acid, $\alpha$- and $\beta$-hydroxy butyric acid, m-hydroxy benzoic acid and the like. Any suitable chain extending agent containing at least two active hydrogen atoms such as —OH, —NH$_2$, —NH, —COOH may be used in the process of this invention.

The invention is further illustrated but not limited by the following examples in which parts are by weight unless otherwise specified.

*Example 1*

(A) A mixture of about 120 parts of polypropylene glycol having an hydroxyl number of about 112 and about 80 parts of polyhexanediol having an hydroxyl number of about 107 are dehydrated for about 30 minutes at about 130° C./18 mm. and stirred with about 60 parts of 1,5-naphthylene diisocyanate and then with about 6.3 parts of 1,4-butanediol at about 130° C. The —NCO/—OH ratio is about 1.2. The melt is poured onto a support and finally heated for about 24 hours at about 100° C. (Test Sheet A.)

If by way of comparison only about 200 parts of polypropylene glycol having an hydroxyl number of about 112 are dehydrated and reacted as described with about 60 parts of 1,5-naphthylene diisocyanate and about 6.0 parts of 1,4-butanediol at about 130° C. and then cured, the mechanical properties of the test sheet B are produced.

The results of the two experiments are set forth as follows:

| Test Sheet | A | B |
|---|---|---|
| Thickness of the test sheet, mm | 6.2 | 5.9 |
| Tensile strength, kg./cm.$^2$ | 240 | 109 |
| Breaking elongation, percent | 750 | 780 |
| Shore hardness A, degrees | 90 | 84 |
| Elasticity, percent | 51 | 41 |

*Example 2*

About 160 parts of polypropylene glycol having an hydroxyl number of about 112 and about 40 parts of polyhexanediol having an hydroxyl number of about 83.6 are dehydrated for about 30 minutes at about 130° C./18 mm. and stirred with about 60 parts of 1,5-naphthylene diisocyanate and thereafter with about 6.93 parts of 1,4-butanediol at about 130° C. The melt is poured onto a support and finally heated for about 24 hours at about 100° C. A material with the following mechanical properties is obtained:

Thickness of the test sheet _____ mm__ 4.7
Tensile strength _____ kg./cm.$^2$__ 219
Breaking elongation _____ percent__ 715
Shore hardness A _____ degree__ 90
Elasticity _____ percent__ 45

*Example 3*

About 120 parts of polypropylene glycol having an hydroxyl number of about 112 and about 80 parts of polyhexanediol having an hydroxyl number of about 83.6 are dehydrated at about 130°/18 mm. and reacted with about 75.3 parts of 1,5-naphthylene diisocyanate and thereafter with about 14 parts of 1,4-butanediol at about 130° and poured into molds.

The cured material has the following properties:

Thickness of the test sheet _____ mm__ 6.0
Tensile strength _____ kg./cm.$^2$__ 202
Breaking elongation _____ percent__ 505
Shore hardness A _____ degree__ 94
Elasticity _____ percent__ 50

*Example 4*

The dehydrated mixture of about 140 parts of polypropylene glycol having an hydroxyl number of about 112, about 60 parts of polyhexanediol having an hydroxyl number of about 53 and about 2.0 parts of trimethylol propane is reacted at about 130° with about 76.7 parts of 1,5-naphthylene diisocyanate and thereafter with about 14 parts of 1,4-butanediol and poured into molds. A test sheet of the cured material has the following mechanical properties:

| | |
|---|---|
| Thickness of the test sheet _____mm__ | 7.2 |
| Tensile strength _____kg./cm.$^2$__ | 240 |
| Breaking elongation _____percent__ | 485 |
| Shore hardness A _____degree__ | 94 |
| Elasticity _____percent__ | 44 |

*Example 5*

50 parts of polyhexane diol (OH-number 89), 50 parts of polypropylene glycol (OH-number 56), 0.4 part 1,4-diazobicyclo-(2,2,2)-octane, 0.05 part dibutyl tin dilaurate, 1 part of polyalkylene glycol polysiloxane copolymer, 2.6 parts of water and 38 parts of toluylene diisocyanate are simultaneously mixed together. The mixture is poured into molds where it within a short period expands to give a soft, elastic foam having the following chemical properties:

| | |
|---|---|
| Bulk density _____kg./m.$^3$__ | 46 |
| Tensile strength _____ k.cm.$^3$__ | 1.2 |
| Breaking elongation _____percent__ | 240 |
| Compression set DIN 53572_____do____ | 23 |
| Elasticity DIN 53573 _____do____ | 29 |
| Deflection hardness (40%) _____ g./cm.$^2$__ | 47 |

It is, of course, to be understood that the working examples are for the purpose of illustration and the invention is not to be limited thereby. Any of the polyhydric polyalkylene ethers, polyisocyanates and the chain extending agents may be substituted throughout the working examples for those specifically utilized therein.

Although the invention has been described in considerable detail for the purpose of illustration, it is to be understood that variations can be made by those skilled in the art without departing from the spirit of the invention and scope of the claims.

What is claimed is:

1. A method for making non-cellular polyurethane plastics which comprises reacting an organic polyisocyanate with a mixture of a polyhydric polyalkylene ether glycol having units in the alkylene chain selected from the group consisting of ethylene and 1,2-propylene with a polyhydric polyalkylene ether having at least six carbon atoms in the alkylene chain and being present in an amount of from about 20% to about 50% by weight of the ether mixture, said polyalkylene ethers having a molecular weight of from about 600 to about 10,000.

2. A method for making non-cellular polyurethane plastics which comprises reacting an organic polyisocyanate with a mixture of a polyhydric polyalkylene ether glycol having units in the alkylene chain selected from the group consisting of ethylene and 1,2-propylene with a polyhydric polyalkylene ether glycol having at least six carbon atoms in the alkylene chain and being present in an amount of from about 20% to about 50% by weight of the glycol mixture, said polyalkylene ether glycols having a molecular weight of at least about 600.

3. A method for making non-cellular polyurethane plastics which comprises reacting an organic polyisocyanate with a chain extending agent containing active hydrogen atoms which are reactive with NCO groups, said active hydrogen atoms being selected from the group consisting of —OH, —NH$_2$, —NH, —COOH and a mixture of a polyhydric polyalkylene ether glycol having units in the alkylene chain selected from the group consisting of ethylene and 1,2-propylene with a polyhydric polyalkylene ether having at least six carbon atoms in the alkylene chain and being present in an amount of from about 20% to about 50% by weight of the ether mixture, said polyalkylene ethers having a molecular weight of at least about 600.

4. The method of claim 3 wherein the polyhydric polyalkylene ethers have a molecular weight of from about 600 to about 10,000.

5. A method of preparing an NCO terminated prepolymer which comprises reacting an excess of an organic polyisocyanate with a mixture of a polyhydric polyalkylene ether glycol having units in the alkylene chain selected from the group consisting of ethylene and 1,2-propylene with a polyhydric polyalkylene ether having at least six carbon atoms in the alkylene chain and being present in an amount of from about 20% to about 50% by weight of the ether mixture, said polyhydric polyalkylene ethers having a molecular weight of at least about 600.

References Cited by the Examiner

UNITED STATES PATENTS

| | | | |
|---|---|---|---|
| 2,929,800 | 3/1960 | Hill _____ | 260—77.5 |
| 3,072,582 | 1/1963 | Frost _____ | 260—2.5 |

FOREIGN PATENTS 227,671   4/1960   Australia.

LEON J. BERCOVITZ, *Primary Examiner.*

DONALD E. CZAJA, *Assistant Examiner.*